United States Patent
Seo et al.

(10) Patent No.: US 9,207,850 B2
(45) Date of Patent: Dec. 8, 2015

(54) APPLICATION EXECUTING METHOD USING FINGERPRINT RECOGNITION, DEVICE THEREFOR, AND COMPUTER READABLE RECORDING MEDIUM THEREFOR

(71) Applicants: CRUCIALTEC CO.,LTD., Chungcheongnam-do (KR); CRUCIALSOFT COMPANY, Seoul (KR)

(72) Inventors: Jong Chul Seo, Gyeonggi-do (KR); Jung Je Park, Seoul (KR); Hyo Min Joo, Gyeonggi-do (KR); Jae Han Kim, Gyeonggi-do (KR); Jun Woo Park, Seoul (KR); Chae Woong Lim, Seoul (KR)

(73) Assignees: CRUCIALTEC CO., LTD., Chungcheongnam-Do (KR); CRUCIALSOFT COMPANY, Seoul (KR)

( * ) Notice: Subject to any disclaimer, the term of this patent is extended or adjusted under 35 U.S.C. 154(b) by 0 days.

(21) Appl. No.: 14/107,879

(22) Filed: Dec. 16, 2013

(65) Prior Publication Data
US 2014/0168125 A1    Jun. 19, 2014

(30) Foreign Application Priority Data
Dec. 17, 2012 (KR) .................. 10-2012-0147776

(51) Int. Cl.
*G06F 3/0487* (2013.01)
*G06F 3/147* (2006.01)
(Continued)

(52) U.S. Cl.
CPC ............ *G06F 3/0487* (2013.01); *G06F 1/1684* (2013.01); *G06F 3/0481* (2013.01);
(Continued)

(58) Field of Classification Search
CPC ....... G06F 3/048; G06F 3/011; G06F 3/0487; G06F 9/48; G06F 9/4812; G06F 9/4837; G06F 21/32; G06F 21/629; G06F 2203/04803; G06K 9/00006; G06K 9/00026; G06K 9/00087; H04L 9/3231; H04L 63/0861
See application file for complete search history.

(56) References Cited

U.S. PATENT DOCUMENTS

2009/0224874 A1* 9/2009 Dewar et al. ................. 340/5.53
2010/0081475 A1* 4/2010 Chiang et al. ................ 455/564
(Continued)

FOREIGN PATENT DOCUMENTS

| KR | 10-0348365 B1 | 7/2002 |
| KR | 2006-0003689 A | 1/2006 |
| KR | 2006-0101963 A | 9/2006 |

*Primary Examiner* — Temesgh Ghebretinsae
*Assistant Examiner* — Keith Crawley
(74) *Attorney, Agent, or Firm* — Revolution IP, PLLC

(57) ABSTRACT

An application-executing method using fingerprint recognition includes obtaining an image of a first fingerprint through a fingerprint sensor and recognizing the first fingerprint, executing a first application corresponding to the first fingerprint in a first screen when the first fingerprint is recognized, obtaining an image of a second fingerprint through the fingerprint sensor and recognizing the second fingerprint, determining whether the second fingerprint is recognized within a predetermined time after the first application is executed, and, based on a determination result, when it is determined that the second fingerprint is recognized within the predetermined time after the first application is executed, generating a second screen by splitting the first screen, and executing the first application on one of the second screen, and a second application corresponding to the second fingerprint on the other of the second screen.

6 Claims, 5 Drawing Sheets

(51) Int. Cl.
  *G06F 1/16*  (2006.01)
  *G06F 3/0481*  (2013.01)
  *G06F 21/00*  (2013.01)
  *G06F 21/32*  (2013.01)
  *G09G 5/14*  (2006.01)
  *G09G 5/00*  (2006.01)
  *G06K 9/00*  (2006.01)
  *H04W 12/06*  (2009.01)

(52) U.S. Cl.
  CPC ............... *G06F 3/147* (2013.01); *G06F 21/00* (2013.01); *G06F 21/32* (2013.01); *G06K 9/00026* (2013.01); *G09G 5/006* (2013.01); *H04W 12/06* (2013.01); *G06F 2203/04803* (2013.01); *G09G 5/14* (2013.01); *G09G 2354/00* (2013.01); *G09G 2358/00* (2013.01)

(56) References Cited

U.S. PATENT DOCUMENTS

| | | | |
|---|---|---|---|
| 2010/0248788 A1* | 9/2010 | Yook et al. | 455/566 |
| 2011/0310044 A1* | 12/2011 | Higuchi | 345/173 |
| 2013/0076485 A1* | 3/2013 | Mullins | 340/5.83 |
| 2013/0120295 A1* | 5/2013 | Kim et al. | 345/173 |
| 2015/0135108 A1* | 5/2015 | Pope | G06K 9/00006 715/767 |

* cited by examiner

APPLICATION EXECUTING METHOD USING FINGERPRINT RECOGNITION, DEVICE THEREFOR, AND COMPUTER READABLE RECORDING MEDIUM THEREFOR

CROSS-REFERENCE TO RELATED APPLICATIONS

This application claims priority to Korean Patent Application No. 2012-0147776 filed on Dec. 17, 2012 in the Korean Intellectual Property Office (KIPO), the entire contents of which are hereby incorporated by reference.

BACKGROUND

1. Field of the Invention

The present invention relates to a method, device, and computer readable recording medium using fingerprint recognition, and more specifically, a method, device, and computer readable recording medium for executing an application using fingerprint recognition.

2. Description of the Related Art

Recently, various additional functionality using personal information, such as mobile banking, in addition to communication functions, such as a call or a text message transmission service, have been provided for users through a mobile communication terminal. Accordingly, the necessity and the importance of a locking device for the mobile communication terminal are being highlighted herein.

Existing locking devices applied to the mobile communication terminal mostly use a password-mediated traditional method. For example, a locking device may be applied to call functions, additional non-call based functions, or international calling functions, and therefore, it is necessary to input a set password in order to use these corresponding functions.

However, this method has problems in that it is useless when the password is disclosed, and its further futility is manifested in needing to change the password periodically in order to secure its safety, and lastly, users have to actually remember the password.

Recently, in order to complement this security method and improve its locking effectiveness, terminals employing a locking device using fingerprint recognition have been under earnest development.

In order to install an application-executing device using fingerprint recognition within the mobile communication terminal, and the manufacturing of the fingerprint recognition apparatus in small sizes, it is necessary to minimize the fingerprint sensor size. According to this requirement, a "slide-type" fingerprint recognition sensor wherein a fingerprint is recognized by swiping the finger on a bar-type sensor extending from side-to-side is under development.

Concurrently, because the fingerprint recognition sensor is typically installed within the mobile communication terminal, efforts for incorporating the sensor with another functionality have been realized.

BRIEF SUMMARY

Example embodiments are provided to improve user convenience by simultaneously executing various applications within a single screen via fingerprint recognition.

According to an aspect of the invention, provided is an application executing method using fingerprint recognition. The method includes obtaining an image of a first fingerprint through a fingerprint sensor and recognizing the first fingerprint, executing a first application corresponding to the first fingerprint on a first screen when the first fingerprint is recognized, obtaining an image of a second fingerprint through the fingerprint sensor and recognizing the second fingerprint, determining whether the second fingerprint is recognized within a predetermined time after the first application is executed, and based on a determination result, wherein it is determined that the second fingerprint is recognized within the predetermined time after the first application is executed, generating a second screen by splitting the first screen, and executing the first application on one of the second screen and a second application corresponding to the second fingerprint on the other of the second screen.

The method may further include, based on the determination result, when it is determined that the second fingerprint is recognized at a time that exceeds the predetermined time after the first application is executed, stopping execution of the first application and executing the second application on the first screen.

The second screen may be obtained by splitting the first screen horizontally in half.

The method may further include storing user setting information that allows the first application to be executed when the first fingerprint is recognized, and allows the second application to be executed when the second fingerprint is recognized.

According to another aspect of the invention, provided is an application executing device using fingerprint recognition. The device includes a fingerprint sensor, configured to consecutively obtain a plurality of fragmented fingerprint images from a user's moving finger and recognize a fingerprint, an application executing unit configured to execute a first application when the fingerprint recognized by the fingerprint sensor is a first fingerprint, and execute a second application when the fingerprint recognized by the fingerprint sensor is a second fingerprint, a predetermined time determining unit configured to determine whether the second fingerprint is recognized by the fingerprint sensor within a predetermined time after the application executing unit executes the first application, and a screen control unit configured to control the determination result of the predetermined time determining unit, a second screen is generated by splitting a first screen when the second fingerprint is recognized within the predetermined time after the first application is executed, and the first application is executed in one of the second screen, and the second application is executed in the other of the second screen.

Based on the determination result of the predetermined time determining unit, when the second fingerprint is recognized at a time that exceeds the predetermined time after the first application is executed, the screen control unit may control the execution of the first application being stopped, and the second application is executed on the first screen.

The second screen may be obtained by splitting the first screen horizontally in half.

The device may further include a user setting information storage unit configured to store user setting information that allows the first application to be executed when the first fingerprint is recognized, and allows the second application to be executed when the second fingerprint is recognized.

The fingerprint sensor may be a bar-type or a straight-type fingerprint sensor.

According to still another aspect of the invention, provided is a computer readable recording medium for recording a method of executing an application using fingerprint recognition and a computer program that executes the method.

DETAILED DESCRIPTION

Detailed descriptions of the invention will be made with reference to the accompanying drawings illustrating specific embodiments of the invention as examples. These embodiments will be described in detail such that the invention can be performed by those skilled in the art. It should be understood that various embodiments of the invention are different, but are not necessarily mutually exclusive. For example, a specific shape, structure, and characteristic of an embodiment described herein may be implemented in another embodiment without departing from the scope and spirit of the invention. In addition, it should be understood that a position or an arrangement of each component in each disclosed embodiment may be changed without departing from the scope and spirit of the invention. Accordingly, there is no intent to limit the invention to the detailed descriptions to be described below. The scope of the invention is defined by the appended claims and encompasses all equivalents that fall within the scope of the appended claims. Like numbers refer to the same or like functions throughout the description of the figures.

Hereinafter, in order to easily perform the invention by those skilled in the art, exemplary embodiments of the invention will be described in detail with reference to the accompanying drawings.

Operations of application-executing device using fingerprint recognition

Figure 1:
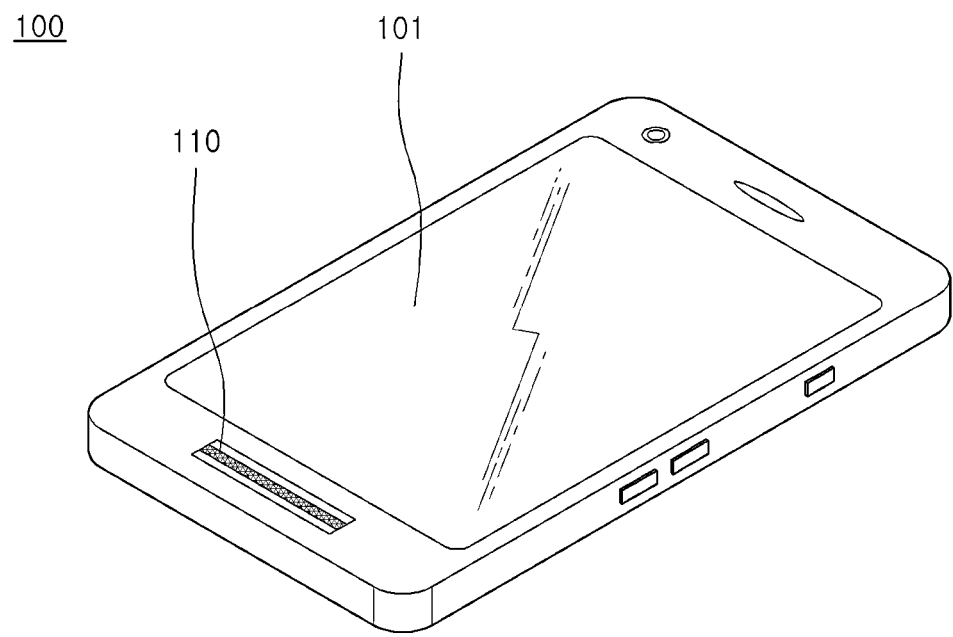
FIG. 1 is a diagram illustrating an overall configuration of an application-executing device using fingerprint recognition, according to an embodiment of the invention.

FIG. 1 is a diagram illustrating a structure of an application-executing device using fingerprint recognition, according to an embodiment of the invention.

As illustrated in FIG. 1, at least a portion of an application-executing device using fingerprint recognition 100 may include a fingerprint sensor 110. In the drawing, although the fingerprint sensor 110 is formed on an edge of the application-executing device using fingerprint recognition 100, the sensor may be formed anywhere, and the modification hereby falls within the scope of the invention.

The application-executing device using fingerprint recognition 100, according to one embodiment, may include a digital device that performs a predetermined data process and performs a user-desired operation. The application-executing device using fingerprint recognition 100 may include an input unit and a display unit 101. The state of an operation, performed by a predetermined operation command from a user through the input unit, may be provided to the user through the display unit 101. Although the display unit 101 of the application-executing device, using fingerprint recognition 100, is implemented as a touch screen method, and performs the function of the input unit at the same time, as in FIG. 1, the input unit may be separately provided from the display unit 101, for example, as a keyboard or a keypad method.

The application-executing device using fingerprint recognition 100, according to one embodiment, may be understood as the term "application-executing" encompasses a digital device, including a memory unit and a microprocessor having a computational capability, for example, a tablet PC, a smart phone, a personal computer, a workstation, a PDA, a web pad, a mobile phone, and a navigation device, or the like.

The fingerprint sensor 110, according to one embodiment, may be implemented as a slide-type. The slide-type fingerprint sensor 110 performs fingerprint recognition wherein a fingerprint of a finger moving in a sliding manner is sensed, and fragmented fingerprint images are read, these fragmented fingerprint images are matched into one image, and then a complete fingerprint image is implemented.

Figure 2:
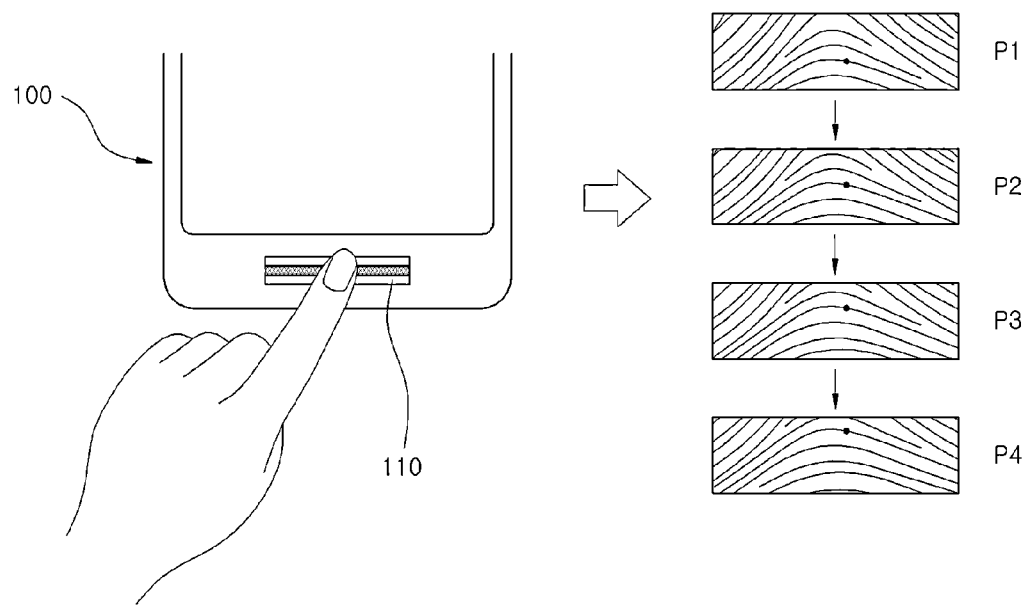
FIG. 2 includes illustrations of exemplary fragmented fingerprint images obtained by a fingerprint sensor, according to an embodiment of the invention.

FIG. 2 includes illustrations of exemplary fragmented fingerprint images obtained by the slide-type fingerprint sensor 110, as illustrated in FIG. 1. For example, when the user moves his or her thumb while touching the fingerprint sensor 110 in a sliding manner, partial fragmented images (P1 to P4) are consecutively obtained.

As such, the user fingerprint images are fragmented, but consecutively obtained in a successive manner. The fragmented fingerprint images read by the fingerprint sensor 110 are then matched into one fingerprint image.

According to one embodiment, the matching fingerprint image may be compared with a pre-registered fingerprint image and used as a method for validating a corresponding user. More specifically, a registered fingerprint image of the user may be stored in a database (not illustrated) of the application-executing device using fingerprint recognition 100, the completed fingerprint image obtained by the fingerprint sensor 110 may be compared with a completed fingerprint image stored in the database, and thus user authentication may be performed.

According to another embodiment, the matching fingerprint image may be compared with at least one pre-registered fingerprint image and used as a command for performing a specific operation. For example, specific operations of matching fingerprints of fingers of the user are stored, and when the matching fingerprint image obtained by the fingerprint sensor 110 matches a fingerprint image of a specific finger, a specific matching operation may be performed. This is referred to as a "quick-launch" function in this specification. For example, the user may set, in advance, that when a thumb fingerprint of a valid user is recognized, a first application is executed and when an index finger fingerprint of a valid user is recognized, a second application is executed. Then, the user moves his or her thumb in a sliding manner while touching the fingerprint sensor 110. When the matching fingerprint image obtained by the fingerprint sensor 110 matches a pre-registered fingerprint image of the thumb, a matching operation or "quick-launch", that is, an execution operation of the first application is performed.

Internal configuration of application-executing device using fingerprint recognition.

Figure 3:
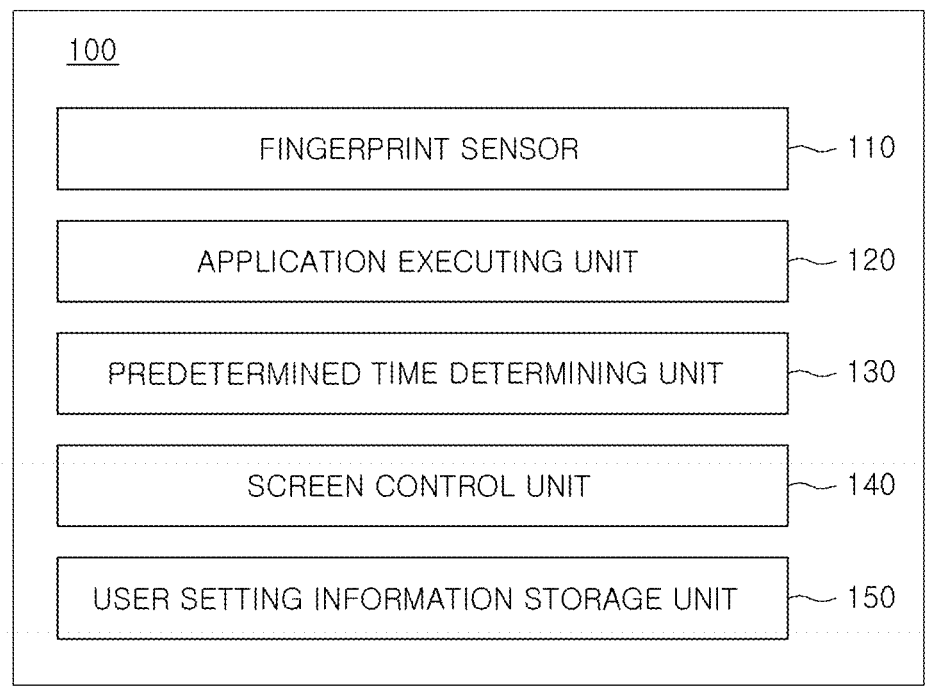
FIG. 3 is a block diagram illustrating an internal configuration of the application-executing device using fingerprint recognition, according to an embodiment of the invention.

FIG. 3 is a diagram illustrating an internal configuration of the application-executing device using fingerprint recognition, according to one embodiment of the invention.

As illustrated in FIG. 3, the application-executing device using fingerprint recognition 100, according to one embodiment, includes the fingerprint sensor 110, an application-executing unit 120, a predetermined time-determining unit 130, and a screen control unit 140, and may further include a user-setting information storage unit 150.

According to one embodiment of the invention, each of the fingerprint sensor 110, the application-executing unit 120, the predetermined time-determining unit 130, the screen control unit 140, and the user-setting information storage unit 150 may be a program module or hardware. These program modules or hardware may be included in the application-executing device using fingerprint recognition 100, or another device capable of data communicating with the application-executing device in the form of an operating system, an application program module, and a program module, and may be physically stored in various well-known recording devices. Meanwhile, these program modules or hardware include routines, subroutines, programs, objects, components, data structures, or the like, which perform, without limitation, a specific task to be described below and execute a specific abstract data type.

The fingerprint sensor 110, according to one embodiment, may be implemented as a slide-type fingerprint sensor, as described with reference to FIGS. 1 and 2. When the user touches a finger on a recognition window of the fingerprint sensor 110 and slides the finger at a predetermined speed, a corresponding fingerprint is scanned, and fragmented fingerprint images may be obtained. The fingerprint sensor 110 sequentially obtains a plurality of fragmented fingerprint images from the user's moving finger and recognizes a fingerprint. This slide-type fingerprint sensor is also referred to as a "bar-type" or a "straight-type" fingerprint sensor, according to the form of the recognition window.

The application-executing unit 120 executes the first application when the fingerprint recognized by the fingerprint sensor 110 is a first fingerprint, and executes the second application when the fingerprint recognized by the fingerprint sensor 110 is a second fingerprint. The user-setting information storage unit 150 receives and stores user-setting information that allows the first application to be executed when the first fingerprint is recognized, and allows the second application to be executed when the second fingerprint is recognized, and may deliver the information to the application-executing unit 120 and the screen control unit 140. That is, the user-setting information storage unit 150 receives and stores user-setting information for performing the above-described "quick-launch" function, and accordingly, the application-executing unit 120 may execute the first application corresponding to the first fingerprint, and the second application corresponding to the second fingerprint.

The predetermined time-determining unit 130 determines whether the fingerprint sensor 110 recognizes the second fingerprint within a predetermined time after the application-executing unit 120 executes the first application corresponding to the first fingerprint. The predetermined time-determining unit 130 determines whether an interval, between a time in which the second fingerprint is recognized by the fingerprint sensor 110, and a time in which the first application is executed is equal to or less than a predetermined time. That is, when the second fingerprint is recognized, while the first application is executed, the predetermined time-determining unit 130 determines whether a time in which the second fingerprint is recognized has an interval within a predetermined time from a time in which the first application is executed.

Based on the determination result from the predetermined time-determining unit 130, when the second fingerprint is recognized within a predetermined time after the first application is executed, the screen control unit 140 controls the first screen wherein the first application executed is split to generate a second screen, whereby the first application is executed on one of the second screen and the second application, corresponding to the second fingerprint, is executed on the other of the second screen.

According to one embodiment, when the second fingerprint is recognized within a predetermined time, while the first application is executed, the screen control unit 140 may control the first screen, wherein the first application executed is split horizontally in half to generate a second screen, thus the first application is executed on an upper screen of the second screen, and the second application is executed on a lower screen of the second screen.

Alternatively, the first screen may be split into any number of screens. For example, the second screen may include two screens, three screens, or four screens, and the second screen may be generated through various methods.

In addition, based on the determination result of the predetermined time-determining unit 130, when the second fingerprint is recognized after the predetermined time is exceeded, after the first application has executed, the screen control unit 140 may control the first application execution to be stopped, and the second application, instead of the first application, is then executed on the first screen. That is, when the second fingerprint is recognized at a time that exceeds the predetermined time, execution of the first application is stopped, and the second application may be executed on the first screen where the first application was executing.

Application executing method using fingerprint recognition.

Figure 4:
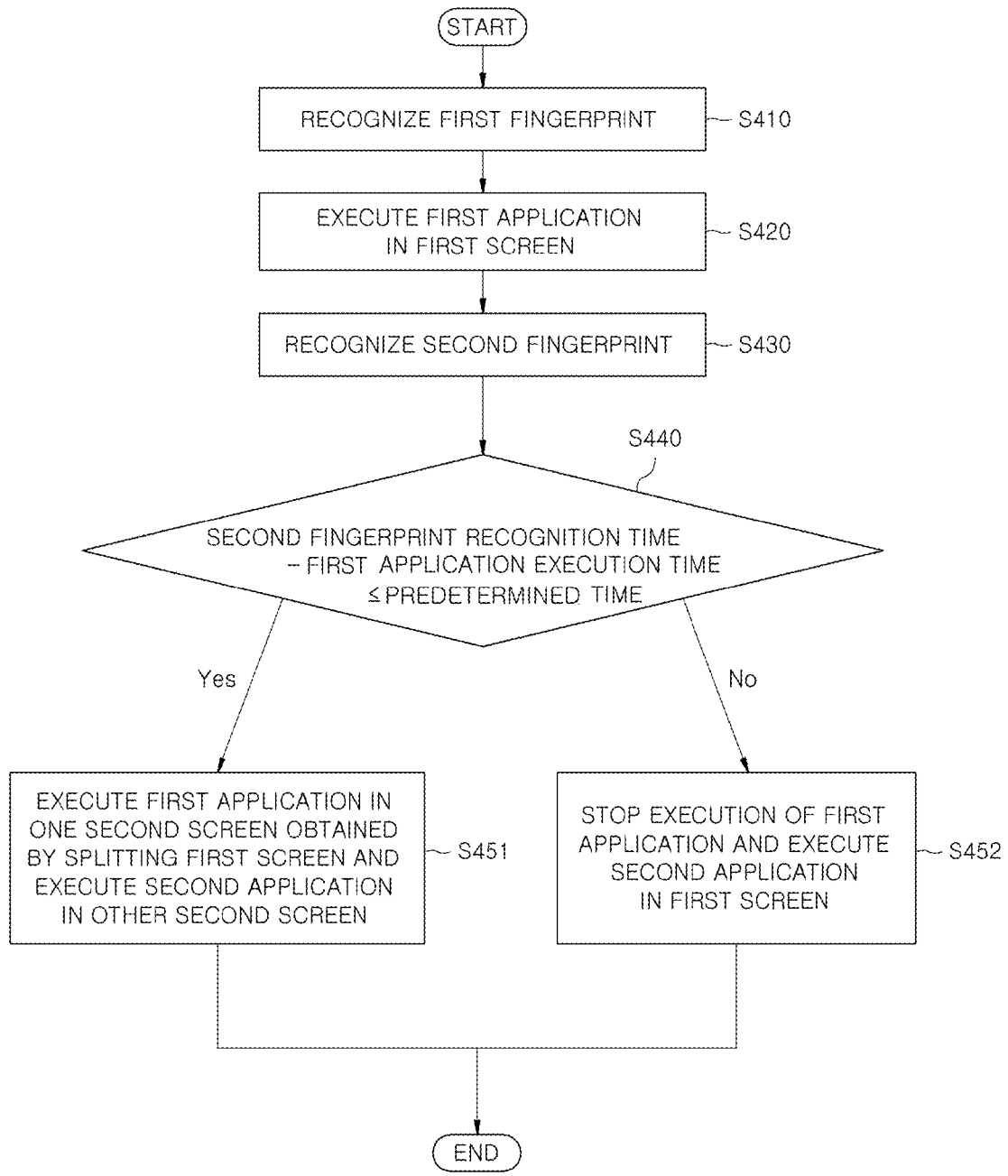
FIG. 4 is a flowchart illustrating an application executing method using fingerprint recognition, according to another embodiment of the invention.
Figure 5:
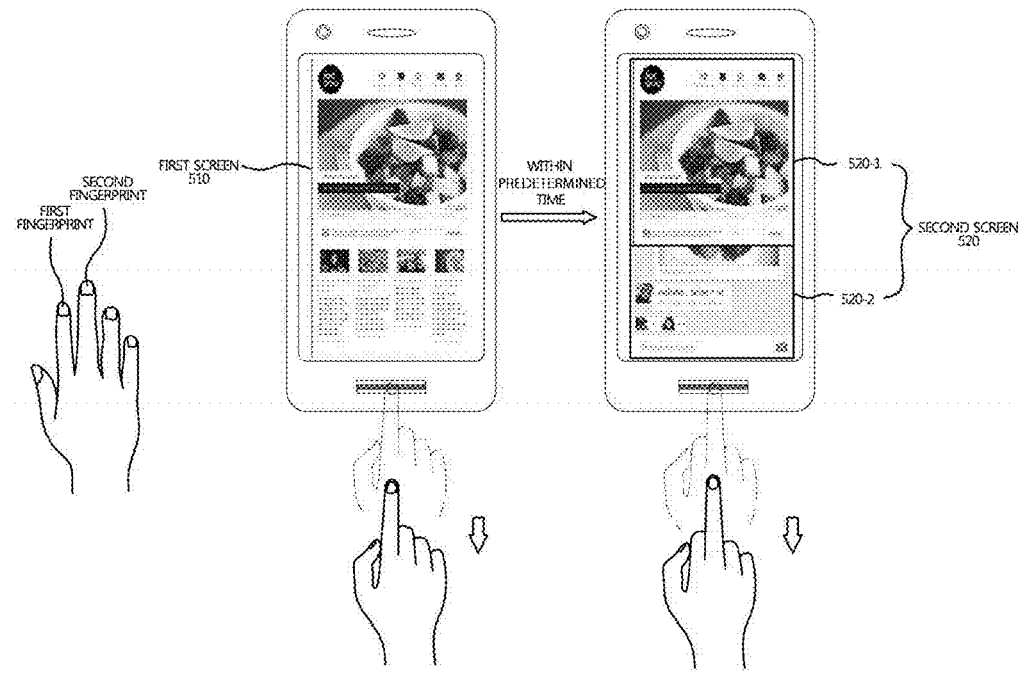
FIG. 5 includes illustrations of screens wherein the application executing method using fingerprint recognition is implemented, according to another embodiment of the invention.

Hereinafter, an application-executing method using fingerprint recognition, according to another embodiment of the invention, will be described with reference to FIGS. 4 and 5. FIG. 4 is a flowchart illustrating the application-executing method using fingerprint recognition, according to another embodiment of the invention. FIG. 5 includes illustrations of screens wherein the application-executing method using fingerprint recognition is implemented, according to another embodiment of the invention.

When a first finger touches the fingerprint sensor 110, fragmented fingerprint images of the first fingerprint are continuously obtained and the first fingerprint is recognized (S410).

As illustrated in FIG. 5, while it is assumed that the first fingerprint is a fingerprint from an index finger on a right hand, the first application that is quickly launched (i.e., "quick-launch") by the first fingerprint is a web browser, the second fingerprint is a fingerprint from a middle finger of the same right hand, and the second application that is quickly launched (i.e., "quick-launch") by the second fingerprint is a chat application.

In this case, before fingerprint recognition operation (S410), user-setting information, which allows the first application to be executed when the fingerprint sensor 110 recognizes the first fingerprint, and allows the second application to be executed when the second fingerprint is recognized, may be received from the user and stored.

When the first fingerprint is recognized, the application-executing unit 120 executes the first application set to be executed, corresponding to the first fingerprint, that is, the web browser, in the first screen 510 (S420). While the web browser as the first application is being executed, the second fingerprint is recognized through the fingerprint sensor 110 (S430).

When the second fingerprint is recognized, the predetermined time-determining unit 130 determines whether the second fingerprint is recognized within a predetermined time after the first application is executed (S440). When it is determined that the second fingerprint is recognized within a predetermined time after the first application is executed, as illustrated in FIG. 5, the first screen 510, wherein the first application is executed, is split to generate a second screen 520. The web browser as the first application is executed on an upper screen 520-1, which is one of the now two screens, and the chat application as the second application is executed on the other screen 520-2 of the second screen 520, at the same time (S451).

Conversely, based on the determination result of the predetermined time-determining unit 130, when it is determined that the second fingerprint is recognized at a time that exceeds the predetermined time following the first application being executed, execution of the web browser that was executing on the first screen, as the first application, is stopped and the chat application, as the second application, is executed on the first screen (S452).

In this way, according to an embodiment of the invention, it is possible to quickly execute various applications using fingerprint recognition, and simultaneously execute various applications on a single screen. As a result, it is possible to improve the user experience and user convenience.

The above-described embodiments of the invention may be implemented as a form of a computer instruction that can be performed through various computer components, and may be recorded on computer readable recording media. The computer readable recording media may include a program instruction, a data file, and a data structure, and/or any combinations thereof. The program instruction recorded on the computer readable recording media may be specially designed and prepared for the invention, or may be an available well-known instruction for those skilled in the field of computer software. Examples of the computer readable recording media include, magnetic media, such as a hard disk, a floppy disk, and a magnetic tape, optical media, such as a CD-ROM and a DVD, magneto-optical media, such as a floptical disk, and a hardware device, such as a ROM, a RAM, and a flash memory, that are specially made to store and perform program instructions. Examples of the program instructions may include a machine code generated by a compiler, and a high-level language code that can be executed in a computer using an interpreter. Such a hardware devices may be configured as at least one software-module in order to perform the operations of the invention, and vice versa.

According to the invention, it is possible to execute different applications according to the use of a fingerprint through fingerprint recognition.

In addition, according to the invention, it is possible to simultaneously execute various applications on a single screen through only fingerprint recognition, without performing any additional operations.

While the invention has been described with reference to specific details, such as detailed components and specific embodiments and drawings, these are only examples to facilitate the overall understanding of the invention and, hence, the invention is not limited thereto. It will be understood by those skilled in the art, that various modifications and alternations may be made.

Therefore, the spirit and scope of the invention is defined not by the detailed description of the invention, but by the appended claims, and encompasses all modifications and equivalents that fall within the scope of the appended claims.

What is claimed is:

1. An application-executing method using fingerprint recognition, comprising:
   receiving a first fingerprint image and recognizing the first fingerprint image;
   executing a first application corresponding to the first fingerprint image in a first screen upon recognition of the first fingerprint image;
   receiving a second fingerprint image and recognizing the second fingerprint image;
   determining whether the recognition of the second fingerprint image is performed within a predetermined time, the predetermined time being started subsequent to the execution of the first application; and
   in response to the determination of the recognition of the second fingerprint image, upon the second fingerprint image being recognized within the predetermined time, operating a second screen by splitting the first screen, wherein,
   the second screen, split from the first screen, displays a second application corresponding to the second fingerprint image, and
   the first screen, not including the second screen, displays the first application corresponding to the first fingerprint image, and the second screen is separately displayed apart from the first screen.

2. The method according to claim 1, further comprising:
   in response to the determination of the recognition of the second fingerprint image, the recognition of the second fingerprint image exceeding the predetermined time after the execution of the first application, stopping the execution of the first application and executing the second application on the first screen.

3. The method according to claim 1, wherein the second screen is operated by splitting the first screen horizontally in half.

4. The method according to claim 1, further comprising:
   before the obtaining of the image of the first fingerprint, storing user-setting information that allows the first application to be executed when a first fingerprint is matched with the first fingerprint image, and allows the second application to be executed when a second fingerprint is matched with the second fingerprint image.

5. A non-transitory computer readable recording medium for recording a computer program that executes the method according to claim 1.

6. An apparatus, comprising:
   a non-transitory computer readable storage device, wherein a plurality of applications are stored in the storage device, the applications comprising a first and a second applications; and
   a fingerprint sensor configured to consecutively obtain a plurality of fragmented fingerprint images from a user's moving finger and recognize a fingerprint, wherein at least one fingerprint image is stored in the storage device, wherein,
   the first application is executed on a first screen by a processor when the fingerprint recognized by the fingerprint sensor is a first fingerprint image, and
   the second application is executed, by the processor, when the fingerprint recognized by the fingerprint sensor is a second fingerprint image, wherein,
   the processor determines whether the recognition of the second fingerprint image is performed within a predetermined time, the predetermined time being started subsequent to the execution of the first application, and in response to the determination of the recognition of the second fingerprint image, upon the second fingerprint image being recognized within the predetermined time, a second screen is operated by splitting the first screen, wherein, the second screen, split from the first screen, displays a second application corresponding to the second fingerprint image, and the first screen, not including the second screen, displays the first application corresponding to the first fingerprint image, and the second screen is separately displayed apart from the first screen.

\* \* \* \* \*